(12) United States Patent
Kobilka et al.

(10) Patent No.: US 10,633,531 B2
(45) Date of Patent: *Apr. 28, 2020

(54) FUNCTIONALIZED CARBON NANOTUBES (71) Applicant: International Business Machines Corporation, Armonk, NY (US)

(72) Inventors: Brandon M. Kobilka, Tucson, AZ (US); Joseph Kuczynski, North Port, FL (US); Jacob T. Porter, Highland, NY (US); Jason T. Wertz, Pleasant Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/240,336

(22) Filed: Jan. 4, 2019

(65) Prior Publication Data

US 2019/0136039 A1    May 9, 2019

Related U.S. Application Data

(63) Continuation of application No. 15/294,106, filed on Oct. 14, 2016, now Pat. No. 10,233,082.

(51) Int. Cl.
*C08L 43/02* (2006.01)
*C08K 9/04* (2006.01)
(Continued)

(52) U.S. Cl.
CPC .............. *C08L 43/02* (2013.01); *C01B 32/15* (2017.08); *C01B 32/174* (2017.08); *C08F 8/26* (2013.01);
(Continued)

(58) Field of Classification Search
CPC . C08L 9/06; H01L 51/0048; H05K 2201/026; C01B 32/168; C01B 32/17; C01B 32/174
See application file for complete search history.

(56) References Cited

U.S. PATENT DOCUMENTS 6,599,961 B1    7/2003   Pienkowski et al.
7,265,175 B2    9/2007   Winey et al.
(Continued)

FOREIGN PATENT DOCUMENTS

CN    101955572 A    1/2011
CN    102329487 B    12/2012
(Continued)

OTHER PUBLICATIONS

IBM, "List of IBM Patents or Patent Applications Treated as Related," for U.S. Appl. No. 16/240,336, filed Jan. 4, 2019.

*Primary Examiner* — Mark S Kaucher
(74) *Attorney, Agent, or Firm* — Patterson + Sheridan, LLP (57) ABSTRACT

A material comprises a carbon nanotube and a methyl methacrylate group covalently bonded to a surface of the carbon nanotube. In some examples, the material can further comprise a polymeric chain appended to the surface of the carbon nanotube via the methyl methacrylate group. In some examples, the polymeric chain can include styrene monomer repeating units and butadiene monomer repeating units. In some examples, the polymeric chain can include a flame retardant moiety appended thereon and/or flame retardant monomer repeating units. In some examples, the carbon nanotube can be incorporated or combined with a resin material to provide a composite component. A method to produce a carbon nanotube having a polymeric chain appended thereto is also described.

19 Claims, 6 Drawing Sheets

(51) Int. Cl.
  *C01B 32/174*  (2017.01)
  *C01B 32/15*   (2017.01)
  *C08F 8/26*    (2006.01)
  *C08K 3/04*    (2006.01)

(52) U.S. Cl.
  CPC ............. *C08K 9/04* (2013.01); *C08K 3/041* (2017.05); *C08L 2201/02* (2013.01)

(56) References Cited

U.S. PATENT DOCUMENTS

| | | |
|---|---|---|
| 7,601,421 B2 | 10/2009 | Khabashesku et al. |
| 8,187,703 B2 | 5/2012 | Zhu et al. |
| 8,288,457 B2 | 10/2012 | Simard et al. |
| 8,367,161 B2 | 2/2013 | Ma et al. |
| 8,545,963 B2 | 10/2013 | Alberding et al. |
| 8,728,359 B2 | 5/2014 | Zeng et al. |
| 8,815,144 B2 | 8/2014 | Harmon et al. |
| 9,328,788 B2 | 5/2016 | Greenhill et al. |
| 2004/0010634 A1 | 1/2004 | Takashima |
| 2004/0101634 A1* | 5/2004 | Park ............ B82Y 10/00 427/558 |
| 2013/0177807 A1* | 7/2013 | Lee ............ H01M 4/621 429/217 |
| 2015/0274848 A1 | 10/2015 | Boday et al. |
| 2018/0105420 A1 | 4/2018 | Kobilka et al. |

FOREIGN PATENT DOCUMENTS

| | | |
|---|---|---|
| CN | 102585291 B | 8/2013 |
| CN | 105297286 A | 2/2016 |
| GB | 2467409 A | 8/2010 |
| KR | 1020140004817 | 5/2012 |
| WO | 20140070092 A1 | 5/2014 |

* cited by examiner

FUNCTIONALIZED CARBON NANOTUBES

CROSS-REFERENCE TO RELATED APPLICATIONS

This application is a continuation of co-pending U.S. patent application Ser. No. 15/294,106, filed Oct. 14, 2016. The aforementioned related patent application is herein incorporated by reference in its entirety.

BACKGROUND

The present disclosure relates to functionalized carbon nanotubes. These functionalized carbon nanotubes have potential uses as fillers in polymeric materials, and more specifically, have applications as impact modifiers and/or flame retardants in polymeric materials.

Carbon nanotubes (CNTs) have been previously explored as filler materials to impart properties to polymeric materials and resins. Nanocomposite materials incorporating CNTs are known in which the CNTs are simply mixed or blended with a matrix resin material, similar in concept to existing carbon fiber composites. A variety of functionalized or modified CNTs have been developed. These functionalized CNTs have, in some instances, been covalently bonded to polymeric matrix resins, but can have separate applications as well. Of particular concern is the use of filler materials to impart improved performance to composite materials with respect to ignition resistance, flame resistance, and/or impact resistance.

SUMMARY

According to one embodiment of the present disclosure, a material comprises a carbon nanotube and a methyl methacrylate group covalently bonded to a surface of the carbon nanotube. In some examples, the material can further comprise a polymeric chain appended to the surface of the carbon nanotube via the methyl methacrylate group. In some examples, the polymeric chain can include styrene monomer repeating units and butadiene monomer repeating units. In some examples, the polymeric chain can include a flame retardant moiety appended thereon and/or flame retardant monomer repeating units.

According to another embodiment, a composite component includes a resin material and a carbon nanotube embedded or encased in the resin material. The carbon nanotube has a methyl methacrylate group covalently bonded to a surface of the carbon nanotube, and a polymeric chain is appended to the surface of the carbon nanotube via the methyl methacrylate group. In some examples, the polymeric chain can include styrene monomer repeating units and butadiene monomer repeating units. In some examples, the polymeric chain can include a flame retardant moiety appended thereon and/or flame retardant monomer repeating units.

According to still another embodiment, a method comprises bonding a carbon nanotube having a carboxylic acid functional group on a surface thereof with an acyl halide to provide a methacrylic functional group on the surface of the carbon nanotube, and copolymerizing the methacrylic functional group with at least one other monomer unit including a vinylic functional group to provide a polymeric chain appended to the surface of the carbon nanotube via the methacrylic function group.

DETAILED DESCRIPTION

The present disclosure relates to polymeric materials and filler materials which can be incorporated into polymeric materials to improve various characteristics of the polymeric material. For example, a composite material with improved flame retardance, as compared to the polymeric material alone, can be formulated by incorporating a filler having flame retardant properties. Similarly, a composite material with improved mechanical properties (e.g., impact resistance), as compared to the polymeric material alone, can be formulated by incorporating a filler that imparts greater rigidity, or some other desirable physical property. However, in some instances, high filler loading levels can adversely affect the properties of the composite material. For example, flame retardant fillers might alter the mechanical properties of the composite. Likewise, a filler incorporated to improve mechanical properties may cause the composite to be more combustible. The present disclosure concerns materials that can be used as filler materials for improving properties of a polymeric material. In some examples, only improvements in mechanical properties of the final composite material are specifically addressed by inclusion of the filler material. In other examples, improvements in both flame resistance and mechanical properties are provided by inclusion of the filler material.

In a particular example, the filler comprises a carbon nanotube (CNT) having orthogonal functionality that can be used to improve impact resistance of polymeric material incorporating the filler. In a more particular example, the CNT may be functionalized with a methyl methacrylate group. The functionalized CNT incorporating such a group may be copolymerized with other constituent monomers to form a composite-type material having improved impact resistance. In a particular example, the functionalized CNT may be incorporated into a styrene-butadiene polymeric material in which the CNT is covalently bonded to the surrounding polymeric material. In some examples, improved flame retardation properties may be provided to the composite material by inclusion of various co-monomers having flame retardant properties, such as acrylic, styrenic, or vinylic monomers having flame-quenching moieties (e.g., phosphorous, halogens, etc.) thereon. In some implementations, the functionalized CNT can be copolymerized with styrene, butadiene, and a flame retardant monomer to provide a composite-type material having improved impact resistance and flame retardant properties as compared to a poly(butadiene-co-styrene) in which CNTs and flame retardant fillers are simply physically blended. Carbon nanotubes are known to be high strength, in terms of tensile strength and elastic modulus, and can be electrically conductive. As such, composite-type materials incorporating CNTs have a variety of uses including in flexible solar cells, any existing composite material application requiring high mechanical strength, and/or flame retardation properties, and/or applications requiring dissipation of electrostatic energy in some manner. The composite-type materials incorporating CNTs in this manner can be further blended or compounded with other polymers.

Figure 3:
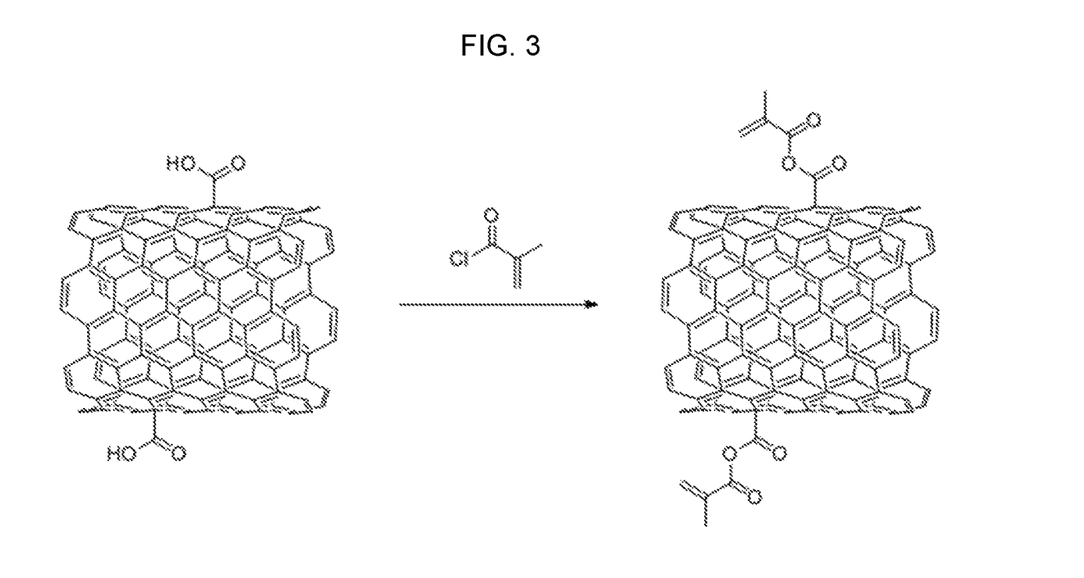
FIG. 3 is an example reaction scheme for the preparation of a carbon nanotube (CNT) having methyl methacrylate functional groups orthogonally disposed thereon.

FIG. 3 illustrates an example reaction scheme for the preparation of a CNT having methyl methacrylate functional groups orthogonally disposed thereon.

The carboxylic acid (—COOH) functional groups on the starting material CNT in FIG. 3 can be prepared by various means, such as an "acid cutting" method or a "nucleophilic addition" method (which requires quenching with carbon dioxide). The carboxylic acid functionalized CNT starting material is reacted with methacroyl chloride via a nucleophilic acyl substitution to give a methacrylic anhydride group on the surface of the CNT. These methacrylic groups are subsequently available for polymerization (or copolymerization).

Radical polymerization techniques, such as use of thermal initiators, photoinitiators, and controlled (living) free radical polymerization, can be adopted for use with the methacrylic-functionalized CNTs. For example, various vinylic, styrenic, and/or conjugated diene co-monomers can be polymerized along with the functionalized CNT. For example, as depicted in the following reaction scheme (FIG. 4), styrene and butadiene monomers can be copolymerized with the functionalized CNT product from FIG. 3.

Figure 4:
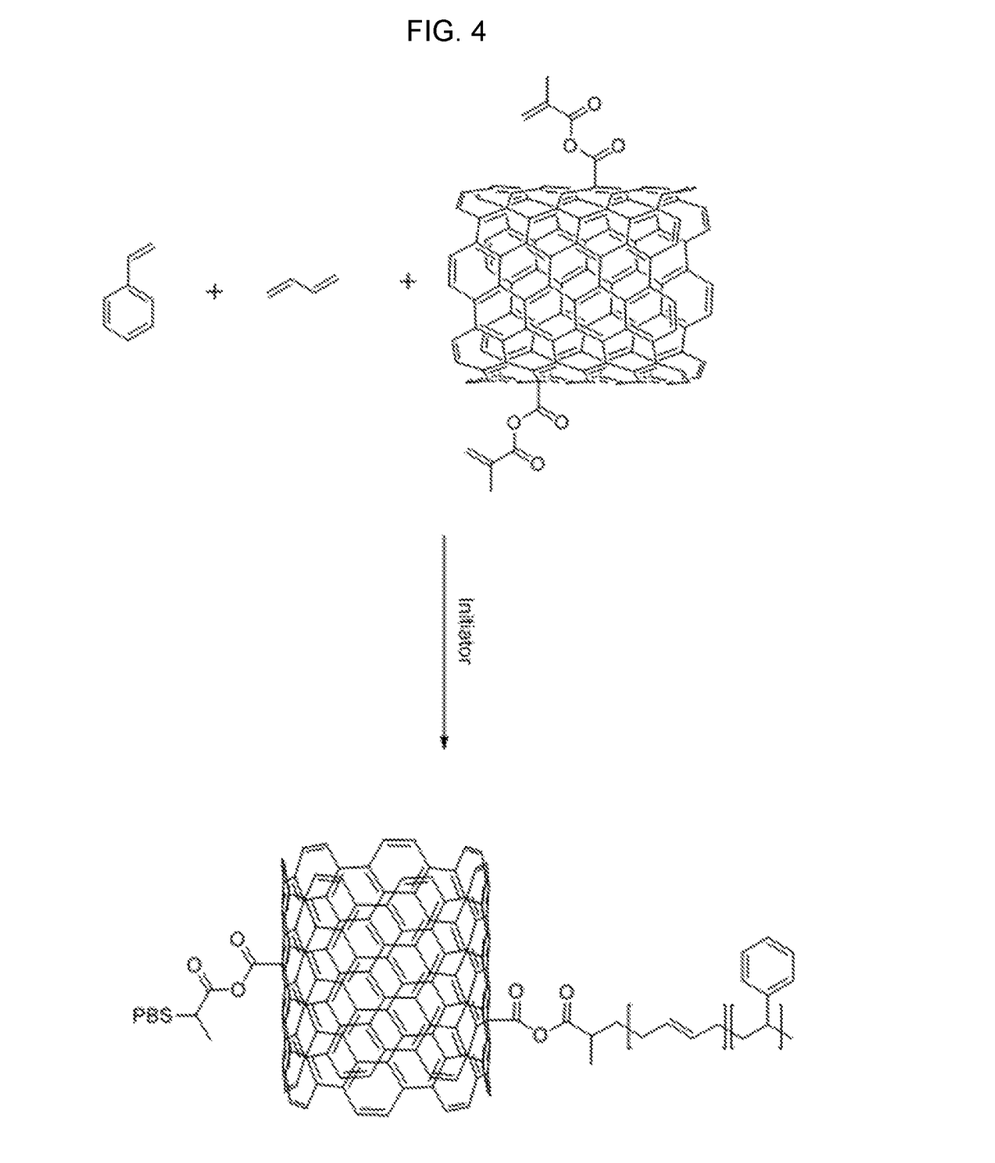
FIG. 4 depicts a copolymerization process providing CNTs orthogonally functionalized with poly(methyl methacrylate-co-styrene-co-butadiene).

FIG. 4 depicts a copolymerization process providing CNTs orthogonally functionalized with poly(methyl methacrylate-co-styrene-co-butadiene). The initiator can be a free radical producing compound triggered by heat, light, or other stimuli. Here, the product CNT is covalently linked (via the methyl methacrylate group) to a poly(styrene-co-butadiene) (PBS) chain. Properties of the PBS can be tuned according to relative ratios of styrene to butadiene, and/or control of polymerization conditions and resulting chain morphology. For example, a block copolymer of PBS can have significantly different properties from a random copolymer of PBS.

Additional monomer types can be copolymerized with the methacrylic-functionalized CNT from FIG. 3. In a particular example (FIG. 5), a flame retardant (FR) moiety can be incorporated in the product CNT. Here, the FR moiety is depicted as a diphenyl phosphate-functionalized methacrylate monomer, but other monomers having a FR moiety may be adopted, such as a phosphate-functionalized styrene monomer, halogenated acrylate monomers, brominated styrene monomer, and other phosphate-functionalized acrylate monomers.

Figure 5:
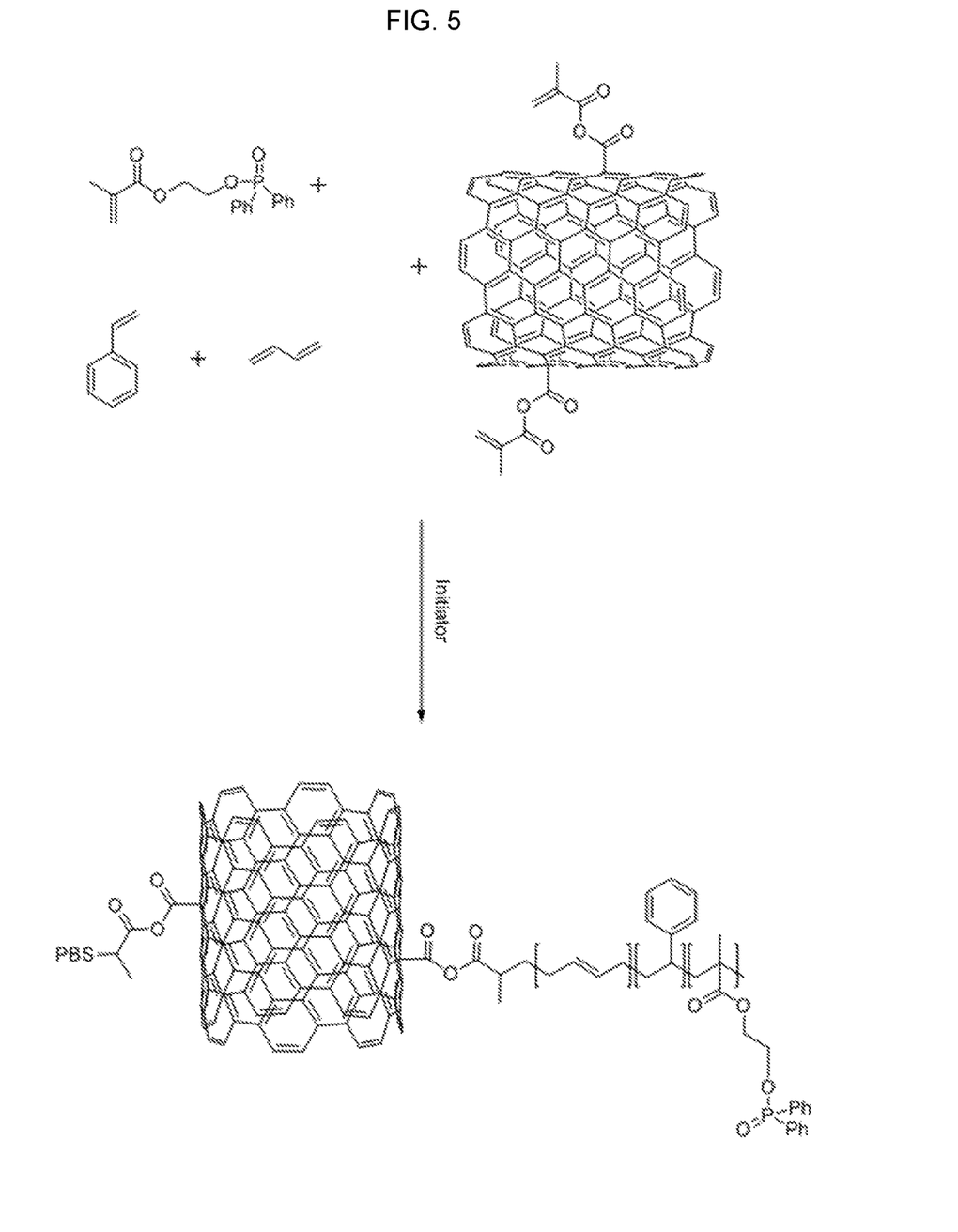
FIG. 5 depicts a copolymerization process providing CNTs orthogonally functionalized with poly(methyl methacrylate-co-styrene-co-butadiene-co-(2-(diphenlyphoshate) ethyl methacrylate).

FIG. 5 depicts a copolymerization process providing CNTs orthogonally functionalized with poly(methyl methacrylate-co-styrene-co-butadiene-co-(2-(diphenlyphoshate) ethyl methacrylate). The initiator can be a free radical producing compound triggered by heat, light, or other stimuli. Here, the product CNT is covalently linked (via the methyl methacrylate group) to a poly(styrene-co-butadiene) (PBS) chain including additional methacrylate groups having an FR moiety. Properties of the PBS chain can be varied according to relative ratios of styrene to butadiene and/or control of polymerization conditions and resulting chain morphology. The number of FR moieties incorporated can likewise be controlled by changes in feed ratio and/or polymerization conditions. It should be noted that the PBS chain depicted in the FIG. 5 product has an FR moiety appended at a position farthest from the CNT surface, such is not a requirement and the FR moieties can be dispersed throughout the PBS chain at various points. The notation used to depict the product compound of FIG. 5 is not intended to imply any particular PBS chain morphology and the PBS chain can be random, block, alternating, or combinations of these according to the selection of polymerization conditions and techniques.

Figure 6:
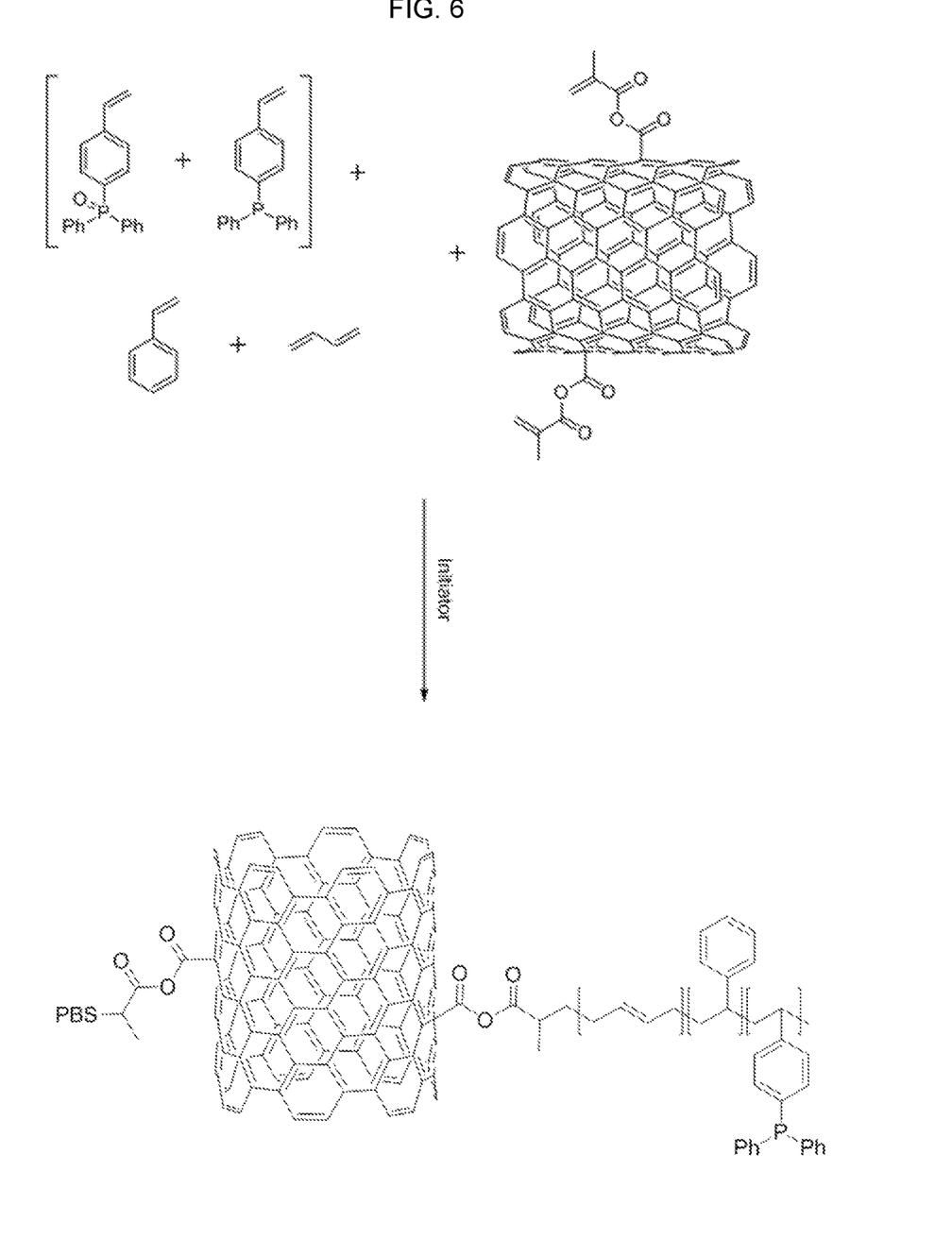
FIG. 6 depicts a copolymerization process providing CNTs orthogonally functionalized with poly(methyl methacrylate-co-styrene-co-butadiene) and diphenylphosphino styrene groups.

FIG. 6 depicts the synthesis of a CNT impact modifier/filler functionalized with poly(methyl methacrylate-co-styrene-co-butadiene) and phosphine-functionalized styrene. Here, the product CNT from FIG. 3 is copolymerized with styrene, butadiene, 4-(diphenylphosphino)styrene, and diphenyl(4-styrenyl)phosphine oxide by a radical polymerization technique.

FIG. 6 depicts a copolymerization process providing CNTs orthogonally functionalized with poly(methyl methacrylate-co-styrene-co-butadiene) and diphenylphosphino styrene groups. The diphenylphosphino group has flame retardant (FR) characteristics. The initiator can be a free radical producing compound triggered by heat, light, or other stimuli. Thus again, as was the case with FIG. 5, the product CNT of FIG. 6 is covalently linked (via the methyl methacrylate group) to a poly(styrene-co-butadiene) (PBS) chain including a FR moiety—in this instance, a diphenylphosphino group. The FR moiety can also be a diphenyl(4-styrenyl)phosphine oxide derived group. In general, properties of the PBS chain can be varied according to relative ratios of styrene to butadiene, and/or control of polymerization conditions and resulting chain morphology. The number of FR moieties incorporated can likewise be controlled by changes in feed ratio and/or polymerization conditions. It should be noted that the PBS chain depicted in the FIG. 6 product has an FR moiety appended at a position farthest from the CNT surface, such is not a requirement and the FR moieties can be dispersed throughout the PBS chain at various points. The notation used to depict the product compound of FIG. 6 is not intended to imply any particular PBS chain morphology and the PBS chain can be random, block, alternating, or combinations of these according to the selection of polymerization conditions and techniques.

Figure 1:
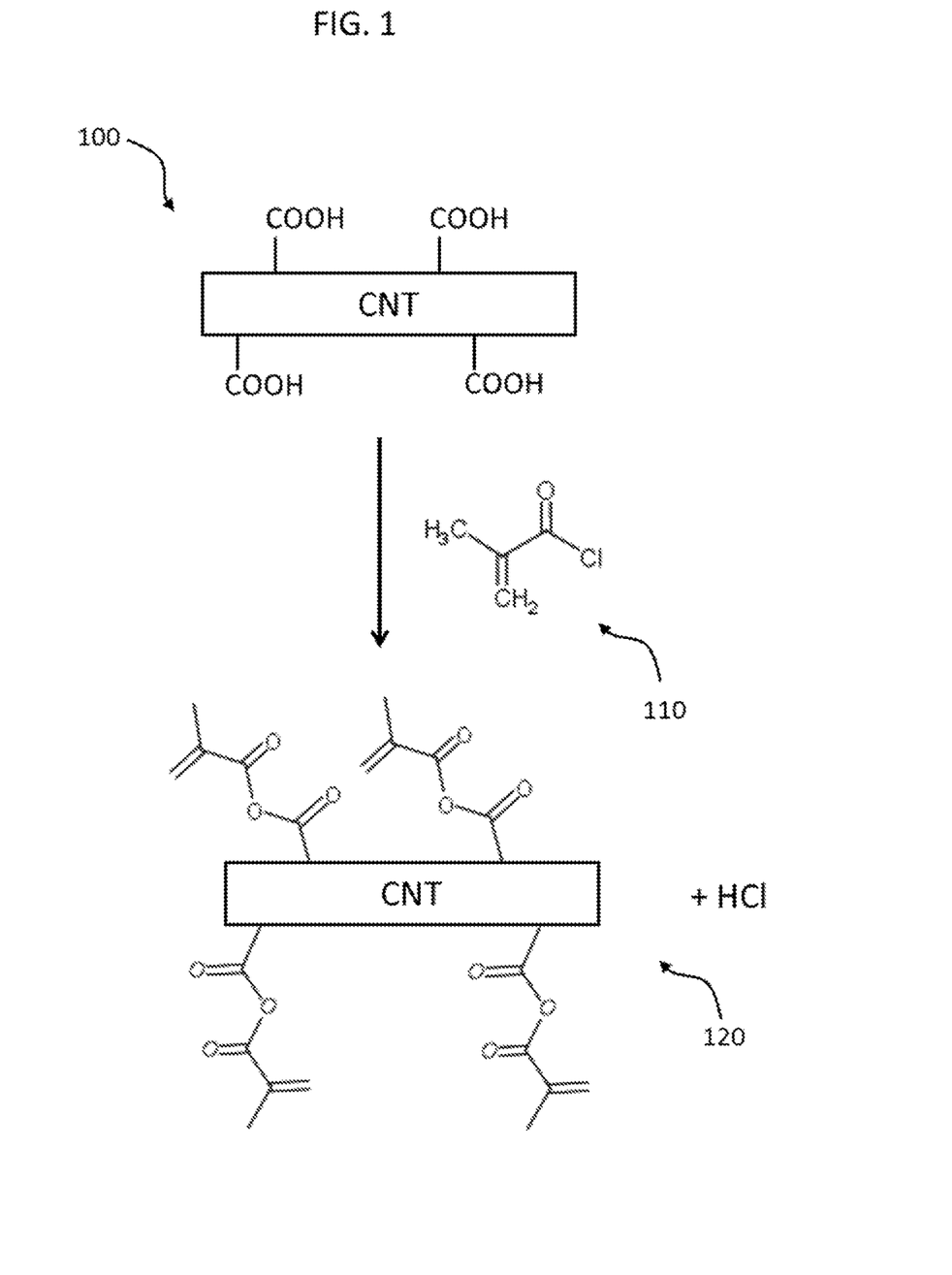
FIG. 1 depicts a reaction of a carboxylic acid functionalized carbon nanotube with an acyl halide to provide a carbon nanotube with a polymerizable functional group.

FIG. 1 depicts a chemical reaction in which a carboxylic acid functionalized CNT 100 is reacted with a reactant 110 to form a polymerizable CNT 120 in which the polymerizable moiety is an orthogonal functional group. In this context, an orthogonal functional group is a group attached to the outer side surface of the carbon nanotube. Reactant 110 is an acyl halide (RCOX, where X is halide and R includes carbons). In the particular example reaction depicted in FIG. 1, the acyl halide is methacryloyl chloride (also referred to as 2-methylprop-2-enoyl chloride) and the polymerizable CNT 120 thus incorporates a methyl methacrylate moiety. However, the chemical reaction is not limited to these specific example compounds and in other instances the reactant 110 may be other acyl halides such as acroyloyl chloride, ethacryloyl chloride, propacryloyl chloride, etc. In some instances, the reaction may be conducted in the presence of catalysts, solvents, proton scavengers, or the like. In some instances, it may be preferred to first protect the vinyl moiety of the acyl halide to prevent or limit unwanted side reactions. The ratio of reactant 110 to CNT 100 (or more particularly, the carboxylic acid functional groups of CNT 100) can be varied. Reactant 110 may be provided to the reaction mixture in a stoichiometric ratio, in a sub-stoichiometric amount, or in excess.

Figure 2:
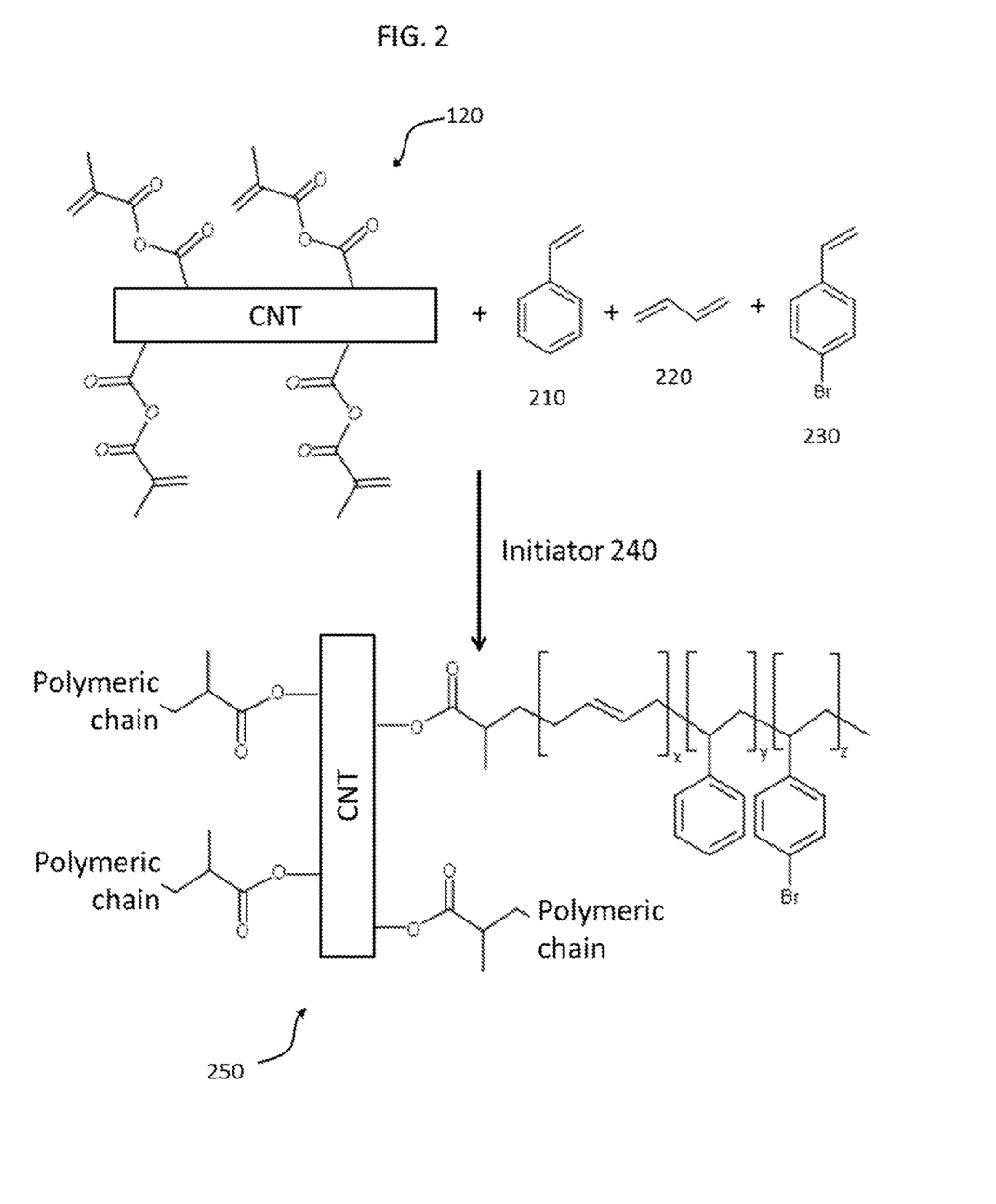
FIG. 2 depicts a co-polymerization of co-monomers with the carbon nanotube having a polymerizable functional group to provide a carbon nanotube having polymeric groups attached thereon.

FIG. 2 depicts a chemical reaction of polymerizable CNT 120 with a variety of co-monomers. In particular, CNT 120 is copolymerized with co-monomer 210, co-monomer 220, and co-monomer 230 to form a modified CNT 250. Inclusion of co-monomer 230 is optional. Co-monomer 210 is, for example, a styrene monomer or another compound incorporating a styrenic functional group. In the particular example depicted in FIG. 2, co-monomer 210 is styrene. Co-monomer 220 is, for example, a 1,3-butadiene monomer or another compound incorporating a 1,3 dienyl moiety available for polymerization reactions. In the particular example depicted in FIG. 2, co-monomer 220 is a 1,3-butadiene. Co-monomer 230 is, for example, a monomer incorporating a flame retardant moiety or otherwise having flame retardant characteristics. In some examples, co-monomer 230 can be a 4-diphenylphosphino styrene, a diphenyl (styrenyl)phosphine oxide, an acrylic monomer with a phosphorous-based flame retardant moiety, a brominated styrene, a brominated vinylbiphenyl, a brominated vinylnapthalene, a brominated vinyl-diphenylethane, a brominated vinylalkane (cyclic or acyclic, $C_6$-$C_{12}$), or an acrylic monomer with a halogen-based flame retardant moiety. In the particular example depicted in FIG. 2, co-monomer 230 is 4-bromostyrene. Brominated styrenes, brominated vinylbiphenyls, brominated vinylnapthalenes, brominated vinyl-diphenylethanes, and brominated vinylalkanes (cyclic or acyclic, $C_6$-$C_{12}$) may be referred to as "brominated monomer units." The polymerization process includes initiator 240, which in this instance is a free radical generator. The relative ratio of co-monomers and CNT 120 can result in modified CNT 250 having different properties or characteristics. For example, a relatively large amount of co-monomer 230 may increase the flame resistance when a greater number of flame resistance moieties are incorporated into the resulting modified CNT 250. Likewise, reaction conditions and polymerization methods can alter the properties of the modified CNT. For example, appending relatively long chains to CNT 120 might increase the compatibility of the resulting modified CNT 250 in certain blends; however, long chains might limit the number or obtainable loading of CNTs in the blended material, which might adversely reduce strength of the blended material. In general, longer polymer chain lengths can be obtained by longer reaction times and lower initiator loadings. In general, shorter polymer chain lengths can be obtained by shorter reaction times and higher initiator loadings. As discussed above with FIGS. 4, 5, and 6, reaction conditions and polymerization techniques can be adopted to alter the morphology as well as the composition of the polymer chains appended to the final product CNT. For example, sequencing of the introduction (and/or removal) of various co-monomers to the reaction mixture during the polymerization process can result in block type polymer chains. Similarly, control of feed stock ratios and reaction times can alter reaction product morphology.

The modified CNT 250 may be included in or otherwise form a portion of a carbon composite material. The modified CNT 250 may be compounded with, blended with, mixed with, or otherwise combined with other polymeric materials. For example, modified CNT 250 can be blended with a polylatic acid, a polycarpolactone, a polyamide, a polyglycolic acid, a polyhydroxybutyrate, a polyhydroxyalkanoate, a polyethylene terephthalate, a polypropylene, a polyethylene, a plaststarch material, a polycarbonate, or a combination of the preceding, or a copolymer of the preceding.

The modified CNT 250 may be blended with another polymer or other polymers as an additive to improve impact resistance of the resulting blend, to improve resistance of the resulting blend to flames or ignition, to modify rheological properties of the resulting blend, or combinations of the preceding reasons.

In some embodiments, the modified CNT 250 may have more than one type of polymeric chain attached thereto. In some examples, the polymeric chains attached to the carbon nanotube(s) may be or include polyurethane, nylon, or polyethene or derivatives of these materials. In general, particular characteristics of the appended polymer chains may differ in aspects such as chain length and ratio of monomeric repeating groups, and the like. That is, the attached polymer chains are not required to each have the same chain length or ratio(s) of monomeric repeat groups. It is also not required that every possible carboxylic acid group on the carbon nanotube be functionalized in the same manner. Some may be left unreacted or may be functionalized in a different manner by, for example, a competing reactive process or by purposeful differentiation of reactive sites in some manner, such as protection of a subset of the carboxylic acid groups sites prior to the reaction with the acyl halide. In some embodiments, a crosslinker (e.g., a trivalent monomer unit) may be incorporated into the reaction mixture to provide cross-linked polymeric connections between CNTs.

The carbon nanotubes in the figures and examples are depicted as single-walled carbon nanotubes (SWNTs); however, the present disclosure can also be applied to multi-walled carbon nanotubes (MWNTs). In general, functionalizations of MWNTs would occur on outer peripheral walls. Other fullerenes besides nanotubes could be similarly modified according to the methods disclosed in the nanotube examples. For example, spherical or ellipsoid fullerenes could be adopted in place of or in addition to nanotubes. Furthermore, graphene materials could similarly be modified according to the disclosed methods.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the described aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

While the foregoing is directed to embodiments of the present invention, other and further embodiments of the invention may be devised without departing from the basic scope thereof, and the scope thereof is determined by the claims that follow.

What is claimed is:

1. A composite component, comprising:
   a resin material;
   a carbon nanotube embdedded in the resin material, the carbon nanotube having a methacrylate group covalently bonded to a surface of the carbon nanotube; and
   a polymeric chain appended to the surface of the carbon nanotube via the methacrylate group, wherein the polymeric chain comprises a styrene unit, a butadiene unit, and a halogen moiety.

2. The composite component of claim 1, wherein the polymeric chain includes a repeating unit having a phosphorous moiety.

3. The composite component of claim 1, wherein the resin material is at least one of a polylactic acid, a polycaprolactone, a polyamide, a polyglycolic acid, a polyhydroxybutyrate, a polyhydroxyalkanoate, a polyethylene terephthalate, a polypropylene, a polyethylene, a plaststarch material, or a polycarbonate.

4. The composite component of claim 1, wherein the halogen moiety includes a halogenated acrylate monomer unit.

5. The composite component of claim 1, wherein the halogenated moiety includes a brominated functionalized monomer unit.

6. The composite component of claim 1, wherein the styrene unit includes a phosphorous-containing styrenic monomer unit.

7. The composite component of claim 6, wherein the phosphorous-containing styrenic monomer unit includes a 4-(diphenylphosphino)styrene monomer unit, a diphenyl(4-styrenyl)phosphine oxide monomer unit, or a combination thereof.

8. The composite component of claim 1, further comprising:
   a second methacrylate group covalently bonded to the surface of the carbon nanotube; and
   a second polymeric chain appended to the surface of the carbon nanotube via the second methacrylate group, wherein the second polymeric chain includes at least one of a styrene monomer unit, a butadiene monomer unit, or a phosphate-functionalized acrylate monomer unit.

9. The composite component of claim 8, wherein the second polymeric chain includes at least one of a 4-(diphenylphosphino)styrene monomer unit or a diphenyl(4-styrenyl)phosphine oxide monomer unit.

10. A composite component, comprising:
    a resin material;
    a carbon nanotube embdedded in the resin material, the carbon nanotube having a methacrylate group covalently bonded to a surface of the carbon nanotube; and
    a polymeric chain appended to the surface of the carbon nanotube via the methacrylate group, wherein the polymeric chain includes at least one of a brominated monomer unit or a phosphorous-containing styrenic monomer unit.

11. The composite component of claim 10, wherein the brominated monomer unit includes at least one of a brominated styrene monomer unit, a brominated vinylbiphenyl monomer unit, a brominated vinylnapthalene monomer unit, a brominated vinyl-diphenylethane monomer unit, an acyclic brominated vinylalkane monomer unit, a cyclic brominated vinylalkane monomer unit, or an acrylic monomer unit with a halogen-based flame-retardant moiety, wherein the halogen-based flame-retardant moiety includes a bromine.

12. The composite component of claim 10, wherein the phosphorous-containing styrenic monomer unit includes at least one of a 4-(diphenylphosphino)styrene monomer unit, or a diphenyl(4-styrenyl)phosphine oxide monomer unit.

13. A method, comprising:
    bonding a carbon nanotube having a carboxylic acid functional group on a surface thereof with a acyl halide to provide a methacrylic functional group on the surface of the carbon nanotube; and
    copolymerizing the methacrylic functional group with at least one other monomer unit including a vinylic functional group to provide a polymeric chain appended to the surface of the carbon nanotube via the methacrylic function group, the polymeric chain comprising:
    a styrene unit,
    a butadiene unit, and
    at least one of a halogen moiety or a phosphorous-containing styrenic monomer unit.

14. The method of claim 13, wherein copolymerizing the methacrylic functional group with the at least one other monomer unit is radical initiated.

15. The method of claim 13, further comprising adding the carbon nanotube having the polymeric chain appended to the surface to a resin material.

16. The method of claim 13, wherein the phosphorous-containing styrenic monomer unit includes a 4-(diphenylphosphino)styrene monomer unit, a diphenyl(4-styrenyl) phosphine oxide monomer unit, or a combination thereof.

17. The method of claim 13, wherein the halogen moiety is a halogenated acrylate monomer unit.

18. The method of claim 13, wherein the halogenated moiety is a brominated functionalized monomer unit.

19. The method of claim 18, wherein the brominated functionalized monomer unit includes at least one of a brominated styrene monomer unit, a brominated vinylbiphenyl monomer unit, a brominated vinylnapthalene monomer unit, a brominated vinyl-diphenylethane monomer unit, an acyclic brominated vinylalkane monomer unit, a cyclic brominated vinylalkane monomer unit, or an acrylic monomer unit with a halogen-based flame-retardant moiety, wherein the halogen-based flame-retardant moiety includes a bromine.

* * * * *